United States Patent
Bartle et al.

(10) Patent No.: US 6,188,888 B1
(45) Date of Patent: Feb. 13, 2001

(54) CHARGING UNIT AND WIRELESS TELEPHONE HAVING MULTI-NUMBER CALL FORWARDING CAPABILITY

(75) Inventors: Alden S. Bartle, Lawrenceville; Clifton J. Barber, Forest Park; Michael A. Wise, Duluth, all of GA (US)

(73) Assignee: Oki Telecom, Inc., Suwanee, GA (US)

(*) Notice: Under 35 U.S.C. 154(b), the term of this patent shall be extended for 0 days.

(21) Appl. No.: 09/050,435

(22) Filed: Mar. 30, 1998

(51) Int. Cl.$^7$ .............................. H04B 1/38; H03M 3/42
(52) U.S. Cl. ........................ 455/417; 455/564; 455/573
(58) Field of Search .................................. 455/414, 417, 455/403, 550, 551, 557, 564, 573, 575, 90; 379/201, 210, 211, 212, 419, 358

(56) References Cited

U.S. PATENT DOCUMENTS

| | | |
|---|---|---|
| 3,659,180 | 4/1972 | Urbush . |
| 4,006,396 | 2/1977 | Bogut . |
| 4,307,455 | 12/1981 | Jushasz et al. . |
| 4,511,761 | 4/1985 | Yamazaki et al. . |
| 4,677,653 * | 6/1987 | Weiner et al. ........................ 455/551 |
| 4,680,527 | 7/1987 | Benenati et al. . |
| 4,768,221 | 8/1988 | Green et al. . |
| 4,850,006 | 7/1989 | Sasaki et al. . |
| 5,111,128 | 5/1992 | Branan, Jr. et al. . |
| 5,127,042 | 6/1992 | Gillig et al. . |
| 5,164,652 | 11/1992 | Johnson et al. . |
| 5,177,426 | 1/1993 | Nakanishi et al. . |
| 5,180,992 | 1/1993 | Akiyama et al. . |
| 5,194,857 | 3/1993 | Gomez . |
| 5,197,092 | 3/1993 | Bamburak . |
| 5,267,262 | 11/1993 | Wheatley, III . |
| 5,276,729 | 1/1994 | Higuchi et al. . |
| 5,325,419 | 6/1994 | Connolly et al. . |
| 5,333,176 * | 7/1994 | Burke et al. ........................ 455/90 |
| 5,359,651 | 10/1994 | Draganoff . |
| 5,515,228 | 5/1996 | Nakayama et al. . |
| 5,526,400 | 6/1996 | Nguyen . |
| 5,526,403 | 6/1996 | Tam . |
| 5,566,357 | 10/1996 | Holcman . |
| 5,577,103 | 11/1996 | Foti . |
| 5,600,704 | 2/1997 | Ahlberg et al. . |
| 5,613,201 | 3/1997 | Alford et al. . |
| 5,657,375 | 8/1997 | Connolly et al. ........................ 455/436 |
| 5,661,780 | 8/1997 | Yamamoto et al. . |

(List continued on next page.)

Primary Examiner—Reinhard J. Eisenzopf
Assistant Examiner—Lester G Kincaid
(74) Attorney, Agent, or Firm—Thomas, Kayden, Horstemeyer & Risley, LLP

(57) ABSTRACT

A Charging unit for a cellular telephone is provided with having means for connection to an electrical power source and a charging circuit for delivering a charging current to a battery pack or the cellular telephone itself, if the cellular telephone includes an internal energy retaining mechanism (e.g., charge storage device such as a battery). The charging unit further includes a plurality of electrical contacts in electrical communication with the charging circuit. Finally, the invention includes at least one user-selectable switch and at least one electrical contact in electrical communication with the at least one user-selectable switch. In accordance with another aspect of the invention, a cellular telephone is provided, wherein the telephone includes a sensing circuit configured to detect the presence of a charging unit. It further includes a circuit configured to identify from the charging unit a designated number to which to forward incoming calls to. Specifically, once the telephone senses that it has been placed on a charging unit, it then looks to the circuit configured to identify a designated number to forward calls to. Preferably, this is accomplished by one or more inputs provided from a user-selectable switch on the charging unit. Finally, the telephone includes a number identifying circuit electrically connected to the at least one input and configured to identify a designated number to transmit to a cell site as a call-forward number. This may be accomplished, for example, by a CPU accessing a number storage memory.

5 Claims, 7 Drawing Sheets

U.S. PATENT DOCUMENTS

| | | |
|---|---|---|
| 5,673,308 | 9/1997 | Akhavan ................................ 379/61 |
| 5,724,417 | 3/1998 | Bartholomew et al. ............. 379/211 |
| 5,736,964 | 4/1998 | Ghosh et al. ........................ 342/457 |
| 5,754,625 | 5/1998 | Shimura . |
| 5,799,067 | 8/1998 | Kikinis et al. .................... 379/93.06 |
| 5,867,798 | 2/1999 | Inukai et al. . |
| 5,915,224 | 6/1999 | Jonsson ................................ 455/552 |
| 5,943,055 * | 8/1999 | Sylvan ................................ 455/557 |
| 5,953,657 | 9/1999 | Ghisler . |

* cited by examiner

CHARGING UNIT AND WIRELESS TELEPHONE HAVING MULTI-NUMBER CALL FORWARDING CAPABILITY

BACKGROUND OF THE INVENTION

The present invention generally relates to personal communication devices, and more particularly to call forwarding systems for personal communication devices.

The wireless telephone industry has long noted that the proliferation of wireless telephones, voice mail systems, pagers, etc. has caused a great deal of confusion since callers often need to know multiple telephone numbers (i.e., office, home, wireless telephone, pager, travel destination telephone numbers, etc.) to have a good probability of contacting the user (subscriber). In addition, calls to wireless telephones are routinely missed if the wireless telephone is turned off. Even if the caller is aware of other likely locations for the user, the probability of contact may still be very low in light of inherent user mobility. This results in loss of accessibility for the mobile telephone user and may negatively impact productivity, business income, family contact, etc. These are all major factors in the original decision for purchasing a wireless telephone (i.e., greater accessibility).

One way to address this problem is to have the subscriber provide to the service provider a list of alternate telephone numbers at which the user may be reached, and the service provider could forward incoming calls accordingly. The user could order the list in the order in which the service provider should try the numbers. Callers may be given only the one mobile telephone number. In this way, when a call is not answered by the mobile phone, the service provider would then call each of the preprogrammed numbers in succession. This solution leads to a great deal of inconvenience for the calling party since accessing all numbers in the list could take a long time.

A second attempt to solve this problem is based on hardware supported call forwarding. Special hardware, such as a land-line residential base station in a dual mode cordless/cellular system, may detect the presence of the mobile unit when within range of the special hardware (i.e., the mobile unit is at work or at home). The special hardware then notifies the wireless telephone system to forward all calls to the preprogrammed land line telephone at that location. Unfortunately, this solution requires a large investment by the user in the special hardware, as well as system infrastructure modifications, and works only if the mobile unit is within range of the special hardware.

There is, therefore, a need in the industry for a system for addressing these and other related and unrelated problems.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to an improved charging unit and cellular telephone providing call-forwarding. In accordance with one aspect of the invention, a charging unit for a cellular telephone is provided having means for connection to an electrical power source and a charging circuit for delivering a charging current to a battery pack or the cellular telephone itself, if the cellular telephone includes an internal energy retaining mechanism (e.g., charge storage device such as a battery). The charging unit further includes a plurality of electrical contacts in electrical communication with the charging circuit. Finally, the invention includes at least one user-selectable switch and at least one electrical contact in electrical communication with the at least one user-selectable switch. Preferably, the user-selectable switch is a simple mechanical switch, such as a rotary switch or one or more toggle switches.

In accordance with another aspect of the invention, a cellular telephone is provided, wherein the telephone includes a sensing circuit configured to detect the presence of a charging unit. It further includes a circuit configured to identify from the charging unit a designated number to forward incoming calls to. Specifically, once the telephone senses that it has been placed on a charging unit, it looks to the circuit configured to identify a designated number to forward calls to. Preferably, this is accomplished by one or more inputs provided from a user-selectable switch on the charging unit. Finally, the telephone includes a number identifying circuit electrically connected to the at least one input and configured to identify a designated number to transmit to a cell site as a call-forward number. This may be accomplished, for example, by a CPU accessing a number storage memory.

In accordance with yet another aspect of the invention, a method is provided for instructing a cellular network to forward calls otherwise directed to a cellular telephone. In accordance with this aspect of the invention, the method includes the steps of sensing the placement of the cellular telephone on a charging unit and, in response, accessing the charging unit to ascertain a user-selectable number to forward calls, otherwise directed to the cellular telephone. Transmitting this user-selectable number to a cell site, which may forward the information to a mobile telephone switching office.

It will be appreciated that the call forwarding automation system includes logic and memory for storing multiple call forwarding telephone numbers, selecting a call forwarding telephone number based upon user selectable information provided to a charging unit, and automatically activating call forwarding to the selected telephone number when the telephone is placed into the charging unit.

According to a second preferred embodiment of the present invention, the wireless telephone automatically prompts the user for activation of call forwarding each time the user places the telephone on the charging unit. The process may provide the user an ability to override the number selected on the charging unit and instead allow the user to select from a list of stored call forwarding telephone numbers provided within the phone, as well as providing the user an ability to manually input a new telephone number. If user input is not received during a defined time period in response to the prompt, the wireless telephone may automatically activate call forwarding if an automatic call forwarding time-out default option is enabled.

Other objects, features, and advantages of the present invention will become apparent upon reading and understanding the present specification, when taken in conjunction with accompanying drawings.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DESCRIPTION OF THE PREFERRED EMBODIMENTS

Figure 1:
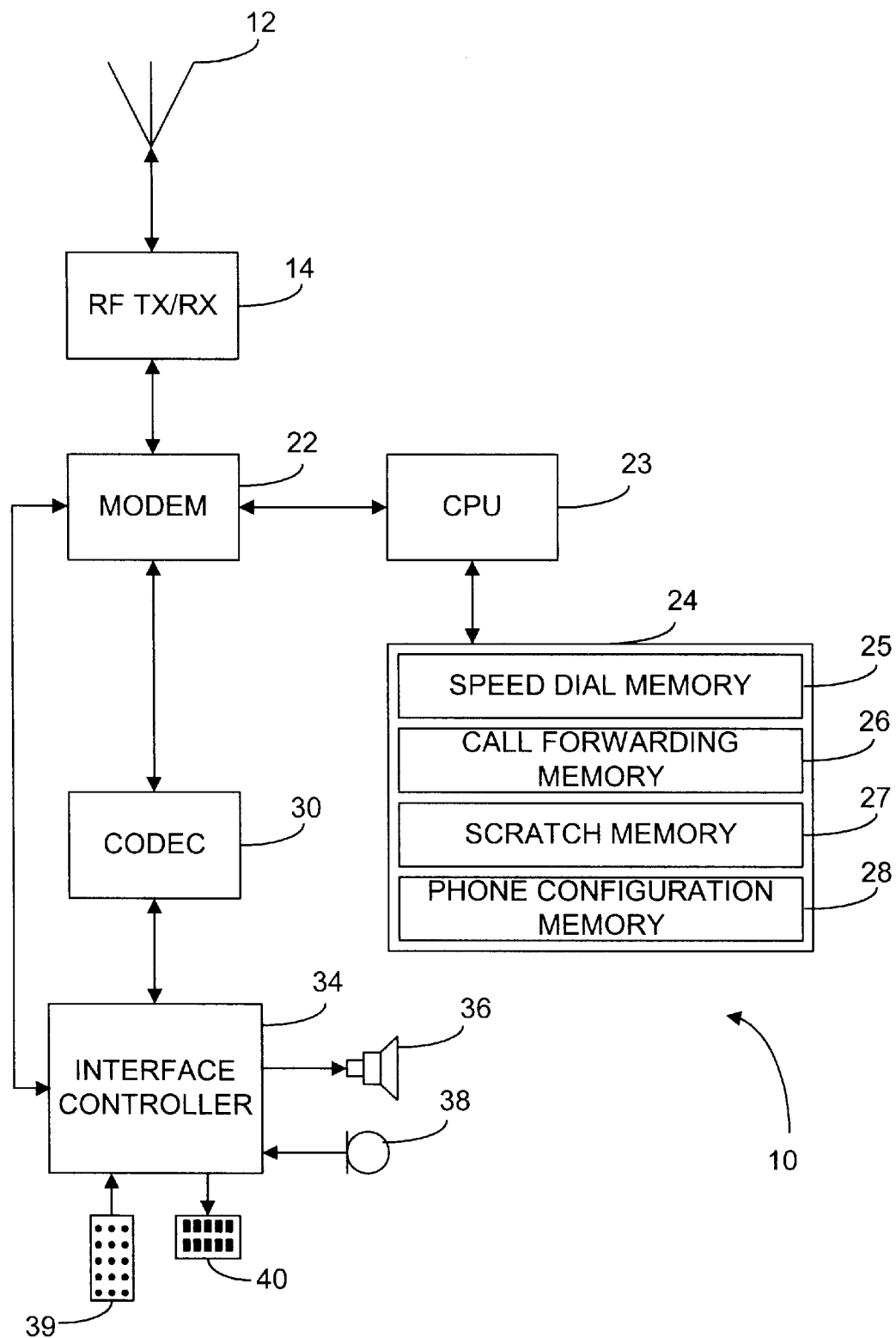
FIG. 1 is a block diagram representation of a wireless telephone, in accordance with preferred embodiments of the present invention.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Referring now in greater detail to the drawings in which like numerals represent like components throughout the several views, FIG. 1 shows a block diagram of a wireless telephone 10 in accordance with preferred embodiments of the present invention. The diagram applies to a variety of wireless telephones of various embodiments of the present invention, as well as various types of conventional wireless telephones, including analog, dual mode cellular, digital, and PCS telephones. According to a first preferred embodiment of the present invention, radio signals are received through an antenna 12 and then filtered and mixed to lower frequencies in a radio frequency transmit/receive (RF TX/RX) circuit 14. A central processing unit (CPU) 23 is connected to a memory 24 which provides storage space for the storing of telephone numbers (SPEED DIAL MEMORY 25 and CALL FORWARDING MEMORY 26), SCRATCH MEMORY 27, and configuration information (PHONE CONFIGURATION MEMORY 28). As controlled by the wireless telephone 10, a modem circuit 22 demodulates the received radio signals into a continuous signal stream, which according to the first preferred embodiment of the present invention, is decoded by the coder/decoder (CODEC) 30 into an audio signal which is controllably amplified by an interface controller 34 and output through a telephone speaker 36. Likewise, a reverse path is followed through the wireless telephone 10 as the telephone microphone 38 detects user speech. A keypad 39 and a display 40 provide conventional user input and output.

Figure 2:
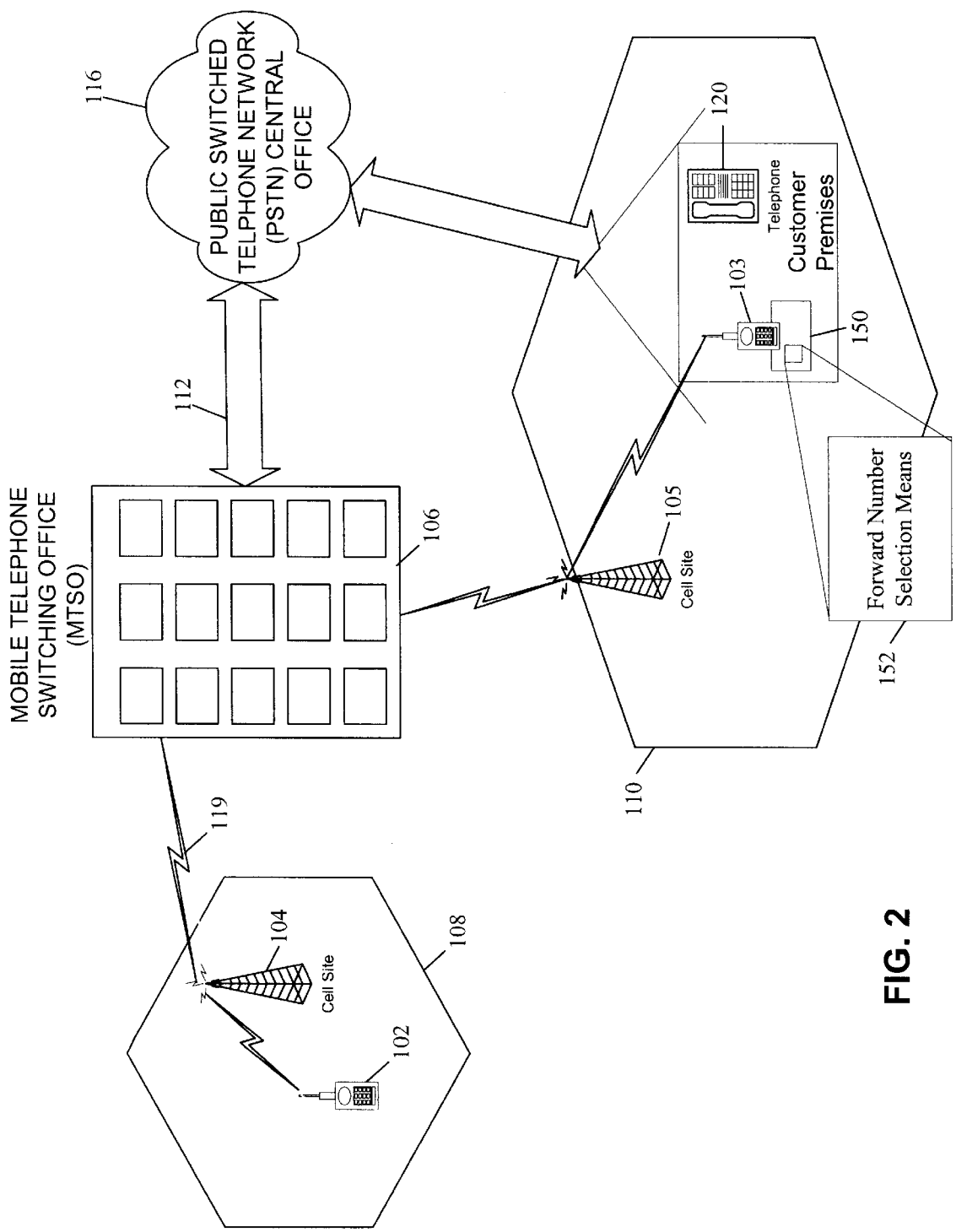
FIG. 2 is a block diagram illustrating the primary components in a cellular and land-line communication system.

Reference is now made to FIG. 2, which shows a top-level block diagram of a portion of a telephone network, and illustrates the intercommunication between a cellular telephone system and a switched telephone network (PSTN). By way of background, the Federal Communications Commission (FCC) controls and regulates the cellular communication industry, In this role, it is responsible for granting licenses required to operate cellular systems. The FCC has divided the country into a number of geographic areas, and to encourage competition, the FCC has decreed that there be two telephone carriers in each geographical area. The FCC has further specified that one carrier must be a land-line, or standard telephone service provider, and the other must be a non-wire provider. Cellular carriers provide cellular systems for each geographical area licensed. The cellular systems serve to interconnect a cellular telephone subscriber with another cellular telephone subscriber or with standard telephones.

As is known and as shown in FIG. 2, there are three principal parts to a cellular telephone system: cellular subscriber stations (for cellular phones) 102, 103 cellular base stations (or cell sites) 104, 105 and a mobile telephone switching office (MTSO) 106. The subscriber stations 102, 103 are typically standard portable or mobile telephones, each consisting of a transceiver, a handset, and antenna. Cellular base stations, or cell sites, 104, 105 are typically dispersed geographically in a reasonably uniform fashion to get the maximum geographic coverage. The geographic region covered by a single cell site 104, 105 is a called a cell 108, 110. While the cells 108, 110 illustrated in FIG. 1 are depicted as being remote from one another, as is known and understood in the art, cell sites 104 will typically be distributed so that a contiguous geographic region is covered and serviced completely by the cellular system. In this regard, each cell 108, 110 will be disposed adjacent a number of other cells, or more specifically, will be surrounded by a number of adjacent cells.

The cell sites 104, 105 are responsible for setting up and maintaining calls placed to and from subscriber stations 102, 103 in their respective cells. The cell sites 104, 105 "hand-off" to neighboring cell sites as a subscriber moves from cell to cell. They also communicate call progress with the MTSO 106.

The MTSO 106 is a telephone switching system with network connections to cellular base stations 104 and trunk lines 112 to and from the public switched telephone network (PSTN) 116. The PSTN 116, in turn, connects to land-line telephones 120, such as those typically existing in residential areas or homes. A principal function of the MTSO 106 is to maintain a database of subscribers and subscriber features, track the progress of calls made to or from subscribers, and record call details for billing purposes. As previously mentioned, such cellular billing typically varies from subscriber to subscriber, depending on a number of factors, including a particular package that a subscriber has purchased from the cellular provider.

The MTSO 106 is typically configured to execute at least three principal functions. The first is a switched network management function, which manages the interconnection of subscriber stations 102, 103 and the PSTN 116. The second principal function includes a system control program which provides various functions to maintain a database of subscriber stations. A third principal function of the MTSO 106 is an automated message accounting program, which delivers call records having data for billing purposes.

To illustrate the operation of this system by way of example, suppose a user initiates a call from telephone 120, to dial and establish a communication line with telephone 102. In a manner that is well known in the art, this call connection will be switched through the PSTN 116, across trunk lines 112, through the MTSO 106, which will then communicate by electromagnetic waves 119 to a cell site 104, which in turn communicates with the telephone 102. Upon receiving the signal from cell site 104 to initiate the call, the transceiver (not shown) inside cellular phone 102 transmits the signals back to the cell site 104. In similar fashion, a user may initiate a call from cell phone 102 to establish a communication link with cell phone 103. This call may be routed simply through the MTSO 106, and need not pass through the PSTN 116.

Having described the basic operation of call routing, reference is now made to FIGS. 3, 4, 5, and 6, to describe the preferred embodiment of the present invention. In this regard, the present invention is directed to an apparatus for performing a call forward operation. Specifically, the invention performs a call forward operation that forwards, or re-directs, calls destined for a cellular phone to an alternative number, such as a land-line telephone. In accordance with the preferred embodiment, the present invention provides a user-selectable mechanism, whereby the user may conveniently select among a plurality of forwarding numbers, and the call forward operation takes place automatically when a user places the telephone 103 on a charging unit 150.

More specifically, one aspect of the preferred embodiment of the present invention is directed to a charging unit 150 for a wireless telephone 103 In operation, the call forwarding feature is automatic. Upon placing a wireless telephone 103 on the charging unit 150, the call forwarding feature of the present invention is automatically carried out. In this regard, circuitry within the telephone senses when the phone is placed on the charging unit 150, to automatically invoke the call forwarding procedure. As will be appreciated by those skilled in the art, the call forwarding feature is carried out by sending a message from the phone 103 to cell site 105, which is forwarded to the MTSO 106. This message instructs the MTSO 106 that any and all incoming calls that are directed to the phone 103 are to be rerouted to another telephone, as specified by the call forwarding number. If the call forwarding number is the number for another cellular telephone (e.g., 102), in the cellular network, then the MTSO 106 manages the rerouting of the incoming call traffic. Alternatively, if the call forwarding number is to be directed to a land-line telephone, such as telephone 120, in the MTSO 106 communicates with the PSTN 116 via trunk 112, when it becomes necessary to reroute an incoming call.

In accordance with another aspect of the present invention, the improved charging unit 150 includes means 152 for specifying one of a plurality of call forwarding numbers. It is contemplated that generally, a person possessing a wireless telephone 103, will often want calls rerouted to only a very small number of alternative phone numbers. For example, when a person arrives to his or her home, that person will frequently prefer all calls coming to that person to come via the land-line telephone 120 of the customer premises. Not only does this ensure that all calls are directed to a common number (as opposed to calls coming to both phones 103 and 120), but calls directed to the land-line telephone 120 are generally much cheaper, since the person will not be required to pay for air time of calls otherwise received over the cellular phone 103. In accordance with the convenience provided by the present invention, the person may, upon arriving at home, simply place the cellular telephone 103 on the charging unit 150, at which time the present invention automatically communicates the rerouting information, such that no further steps have to be taken by the person to ensure that incoming calls otherwise directed to the cellular phone 103 are redirected to the land-line telephone 120.

In accordance with the preferred embodiment of the present invention, a new and unique charging unit 250 (see FIG. 3) is provided. As is known, there are typically four contacts or pins 254 provided on a battery charging unit 250. However, in accordance with the charging unit 250 of the present invention, at least one (preferably two) additional contact 254 is provided. It is through this at least one additional contact that the call forwarding information is communicated to the telephone 103, and ultimately to the MTSO 106. In accordance with the discussion that follows, it will be appreciated that one, two, or even more additional contacts 254 may be provided in connection with the charging unit 250.

Before discussing these specific contacts 254, however, a brief discussion of the mechanical structure of the charging unit 250 is provided. In this regard, a receiving slot 256 is provided to receive the heal or bottom of a wireless telephone (not shown in FIG. 3). The charging unit 250 of the preferred embodiment is designed to receive an entire telephone unit (telephone with attached battery pack), and not just a battery pack. In this regard, the receiving slot 256 is a appropriately sized to snugly receive the bottom end of a telephone. Notwithstanding, to allow for the charging of a battery pack in isolation (i.e., without attachment to a telephone), an optional guide 258 may be provided. As will be appreciated by those skilled in the art, this guide serves to permit a battery, without attachment to a telephone, to rest within the charging unit 250, without sliding away from the contacts 254 or toppling over.

Figure 3:
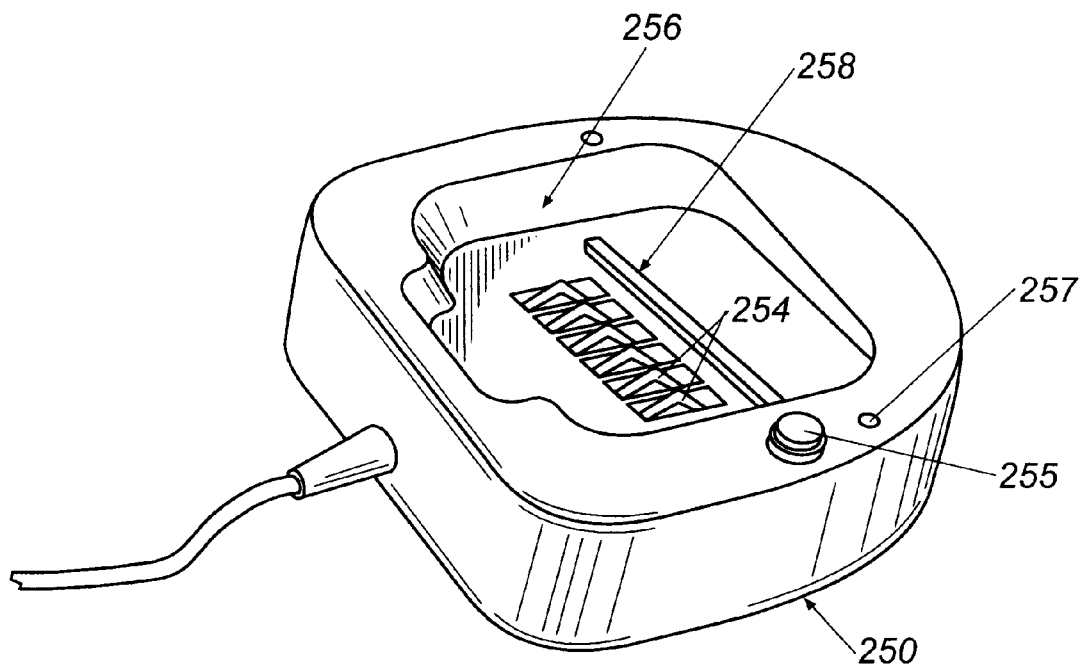
FIG. 3 is a perspective view of a battery charging unit constructed in accordance with the invention.
Figure 4:
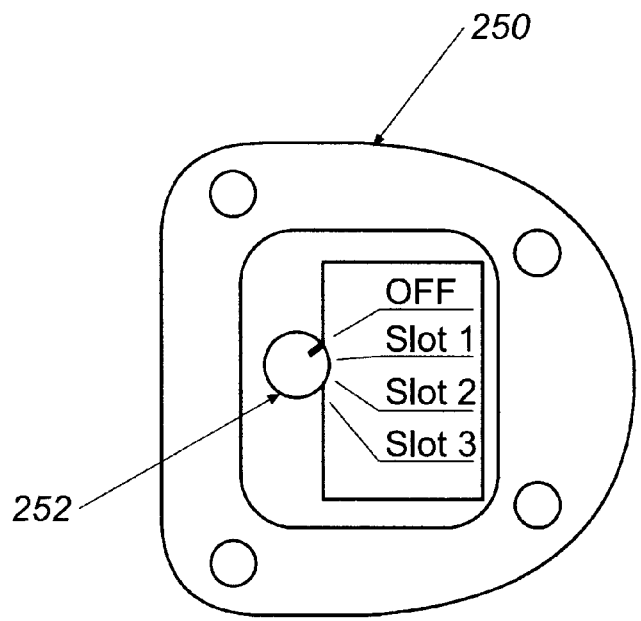
FIG. 4 is a bottom view of the battery charging unit of FIG. 3.

Referring now to FIG. 4, a bottom view of the charging unit 250 is shown. As described above, an important aspect of the preferred embodiment of the invention is the ability of the telephone to communicate (to a cellular network) one of a plurality of user-selectable forwarding phone numbers. In the illustrated embodiment, this feature is embodied in a multi-position switch 252. Specifically, the switch 252 is a four-position rotary switch having an OFF position, and three alternative positions. Each alternative position designates a different forwarding phone number. This information is then encoded for communication to the telephone 260. Specifically, six electrical contacts 254 are illustrated in FIG. 3. These include the four standard contacts, and two additional contacts. The two additional contacts reflect the encoded four position switch 252. That is, the switch information is sent in a binary form across the electrical contacts 254 to the cellular telephone. A binary value of 00 may be used to represent or encode the first switch position, a value of 01 the second switch position, a value of 10 the third switch position, and a value of 11 the fourth switch position. In similar fashion, an eight position rotary switch may be encoded with the addition of three additional electrical contacts 254. It will be further appreciated that, consistent with the concepts and teachings of the present invention, a variety of switch configurations and additional conductors may be utilized to implement the broad concepts (e.g., user selectability) of the present invention.

Returning briefly to FIG. 3, an optional override switch 255 may be provided, whereby depressing this switch 255 overrides the functionality of the rotary switch on the bottom of the charging unit 250. An optional display, such as an LED 257, may also be provided to signal the user, for example, as to whether the call forwarding feature is active.

Figure 5:
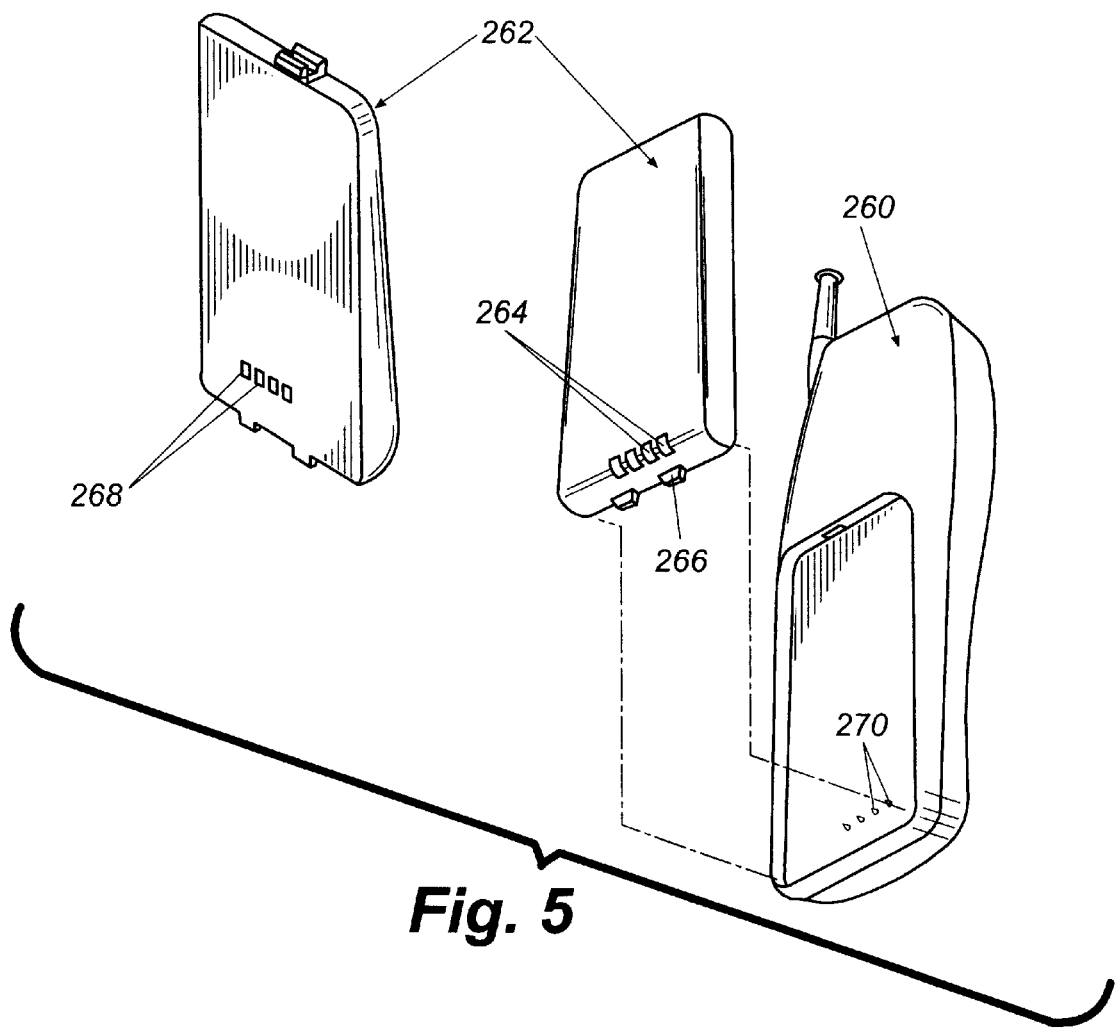
FIG. 5 is an exploded-perspective view of a cellular telephone and battery pack constructed in accordance with the invention.

Referring now to FIG. 5, an illustration of a cellular phone 260 and battery pack 262 are shown. Contacts 264 are provided on the lower side of the battery pack 262. When the phone 260 is placed in the receiving slot 256 of the charging unit 250, the contacts 264 align and come into contact with the electrical contacts 254 of the charging unit 250. Tabs 256 may be provided on the bottom of the battery pack 262 which will rest against the guide 258, to support the battery 262 in an upright position, if it is placed in the charging unit 250 without the telephone 260. Corresponding contacts 268 are provided on the opposite side of the battery pack 262 for alignment and engagement with electrical contacts 270 provided on the telephone 260. Again, typically there are four contacts provided in each of these contact locations, the purpose and function of which are known and understood by those reasonably skilled in the art. The two additional contacts, however, are used to communicate the forwarding number selection means information to the telephone 260, and will be further discussed below in connection with FIGS. 6A–6C.

Figure 6A:
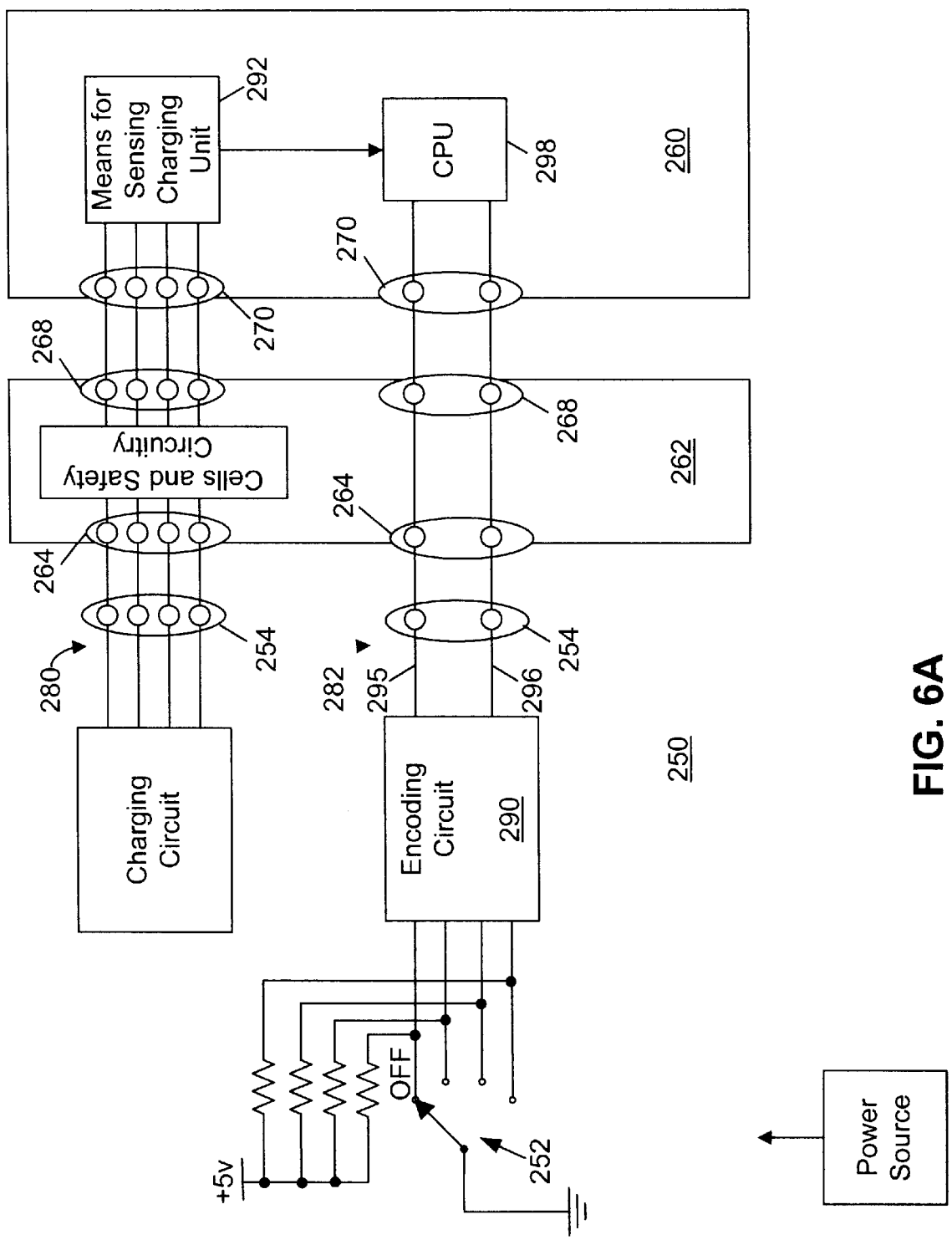
FIGS. 6A–6C are schematic diagrams of the battery charging unit of FIG. 3 and a cellular phone constructed in accordance with the invention.

Referring now to FIG. 6A, a schematic diagram is shown illustrating the electrical relationship between the battery charging unit 250, the battery pack 262, and the telephone 260. In this regard, the contacts 254, 264, 268, and 270 are illustrated. In the illustration of FIG. 6A, the four contacts of grouping 280 represent the four typical or standard contacts that are provided in a cellular telephone system. The remaining two contacts 282 provide the functionality in accordance with the number selection means of the present invention. In this regard, a direct electrical connection is provided through the battery pack 262 for these two signal contacts. In contrast, the four contacts typically provided are not directly connected through the charging unit, but rather are connected within the battery pack 262 to charging and safety circuitry (detail omitted), as is known in the art.

A mechanism 292 is provided for sensing the presence of a charging unit 250. Preferably, this mechanism is in the form of a circuit that monitors at least one of the signals carried across the standard four contacts 280. This circuit 292 outputs one or more signals to the CPU 298 to reflect the presence or absence of a charging unit 250.

The four-position rotary switch 252 is illustrated in the OFF position. In this position, the encoding circuitry 290 may operate to output a binary value of 00, and transmit this value across the conductors 295 and 296. If the switch 252 is moved into the first position, then the encoding circuitry 290 places a logic 1 on conductor 295, while maintaining a value of logic 0 on conductor 296. Likewise, if the switch 252 is moved to the encoding circuitry 290 will place a logic 1 on conductor 296 and a logic 0 on conductor 295. Finally, if the switch 252 is moved to the fourth position, the encoding circuitry 290 places a logic high on both conductors 295 and 296. These signal lines may be communicated (either directly or indirectly) to a central processing unit 298 of the cellular 260. By reading the logic values on these two conductor lines 295 and 296, the CPU can ascertain the position that the switch 252 presently rests in.

In response to the signals delivered across contacts 270, the CPU 298 may be programmed to access a look up table or other appropriate memory location (e.g., call forwarding memory 26 of FIG. 1) to retrieve the call forwarding number that is associated with the particular switch position of the switch 252. Once that number has been retrieved from memory, then the CPU 298 may instruct the phone 260 to communicate that information to the appropriate cell site, in a manner as described above and is understood by those skilled in the art.

Figure 6B:
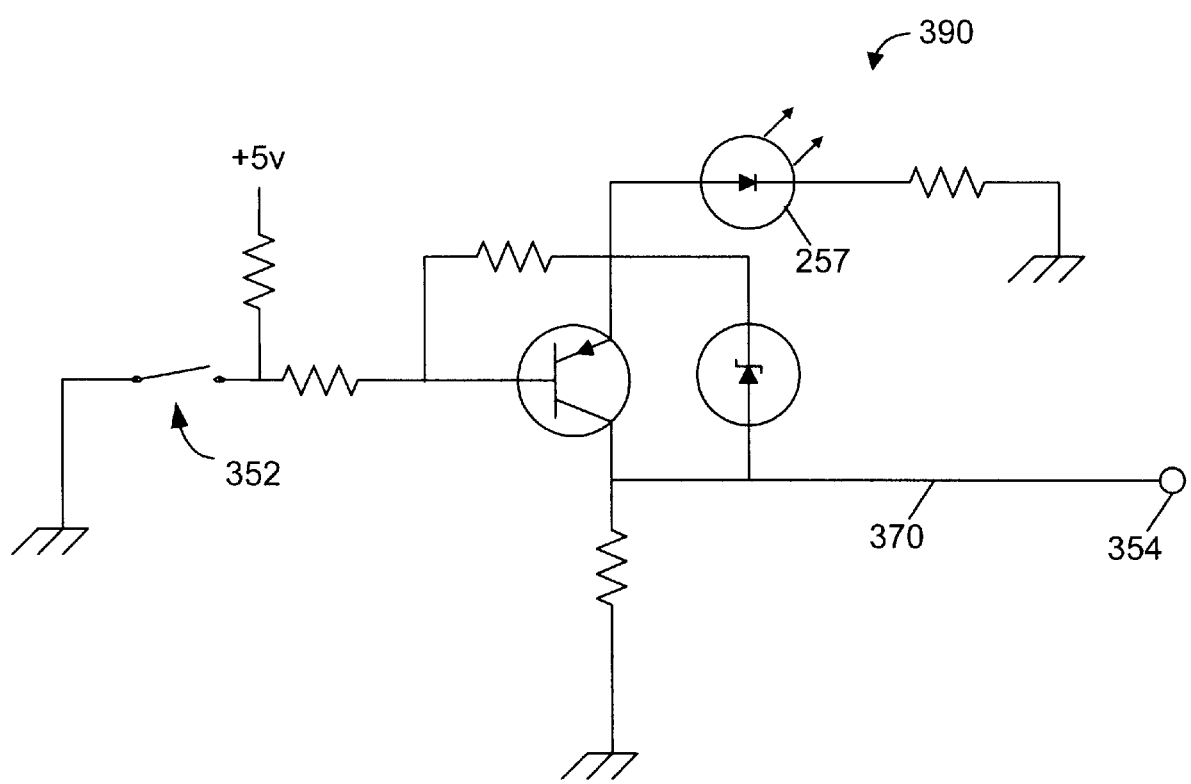
Figure 6C:
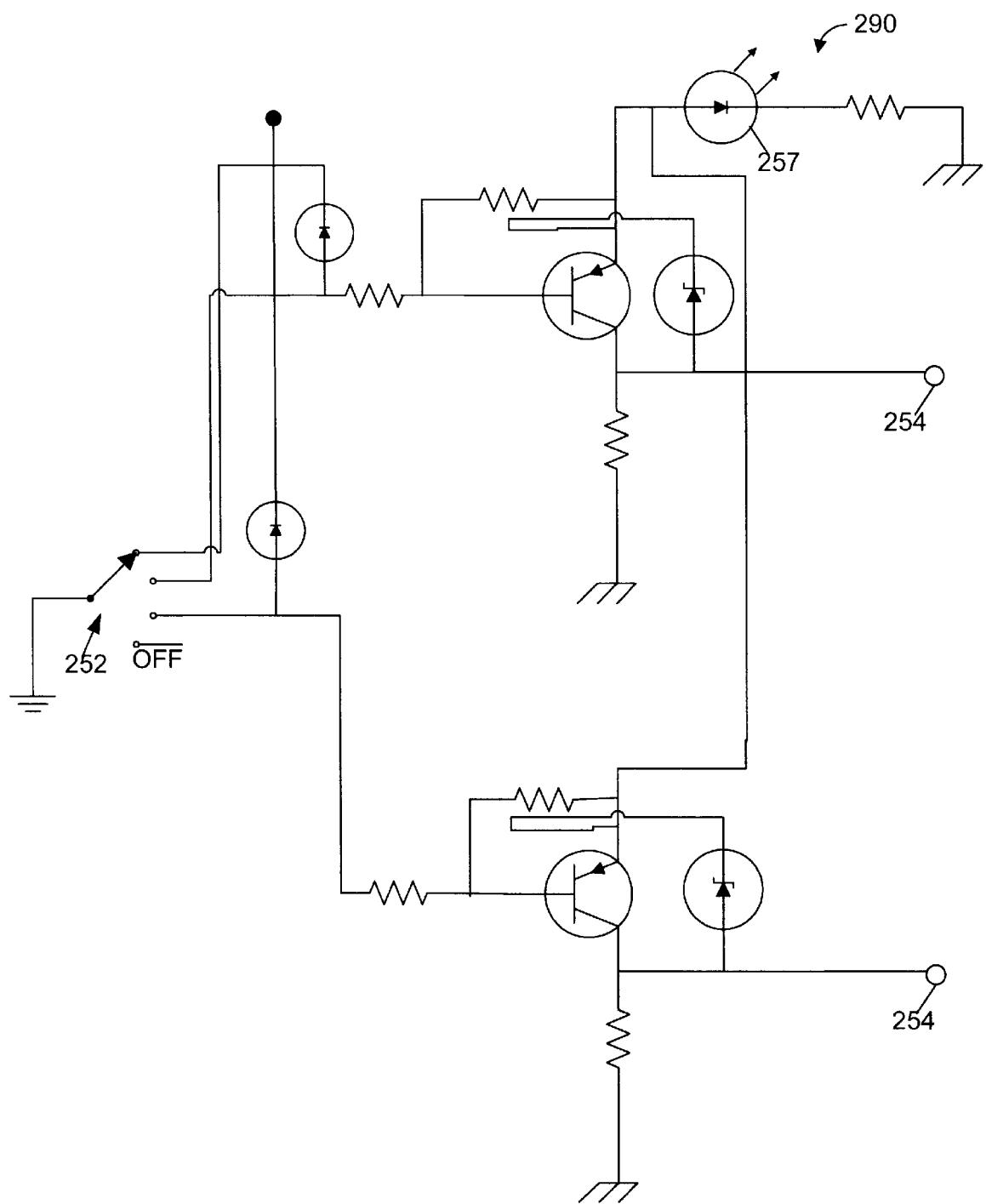

Reference is briefly made to FIGS. 6B and 6C, which illustrate two different embodiments of the encoding circuitry 290. FIG. 6B illustrates a circuit that may be used to encode a single toggle switch 352 configuration, whereby the switch position is encoded onto a single line 370, which is communicated to the CPU of the cellular phone (not shown). In this configuration, one position of the switch 352 may indicate that that the call forwarding feature is to be disabled, while the other position may design a single call forwarding number (e.g., the number of the land-line telephone 120 (FIG. 2). FIG. 6C illustrates a circuit that may be used to encode the four position rotary switch of the preferred embodiment. The LED 257 (also shown in FIG. 3) is also illustrated.

While the embodiments of the present invention which have been disclosed herein are the preferred forms, other embodiments of the method and apparatus of the present invention will suggest themselves to persons skilled in the art in view of this disclosure. Therefore, it will be understood that variations and modifications can be effected within the spirit and scope of the invention and that the scope of the present invention should only be limited by the claims below. Furthermore, the corresponding structures, materials, acts, and equivalents of any means—or step-plus-function elements in the claims below are hereby described to include any structure, material, or acts for performing the claimed functions in combination with other claimed elements as specifically claimed.

We claim:

1. A charging unit for a cellular telephone comprising:

means for connection to an electrical power source;

a charging circuit;

a plurality of electrical contacts in electrical communication with the charging circuit;

at least one user-selectable switch for defining at least one call forwarding number;

at least one electrical contact in electrical communication with the at least one user-selectable switch; and an encoding circuit interposed between the at least one user-selectable switch and the at least one electrical contact in electrical communication with the at least one user-selectable switch, wherein the encoding circuit is configured to encode the number of switch positions into a fewer number of data lines, the data lines being electrically connected to the at least one electrical contact in electrical communication with the at least one user-selectable switch.

2. The charging unit as defined in claim 1, wherein the user selectable switch is a rotary switch.

3. The charging unit as defined in claim 1, wherein the user-selectable switch is a four-position rotary switch.

4. The charging unit as defined in claim 3, wherein there are two electrical contacts in electrical communication with the at least one user-selectable switch.

5. The charging unit as defined in claim 1, wherein the user selectable switch is at least one toggle switch.

* * * * *